Jan. 16, 1962 — R. F. SCHWING — 3,017,039
COAL HANDLING APPARATUS
Filed July 21, 1959 — 4 Sheets-Sheet 1

INVENTOR.
RONALD F. SCHWING
BY
ATTORNEY

Jan. 16, 1962 R. F. SCHWING 3,017,039
COAL HANDLING APPARATUS
Filed July 21, 1959 4 Sheets-Sheet 4
Fig. 6
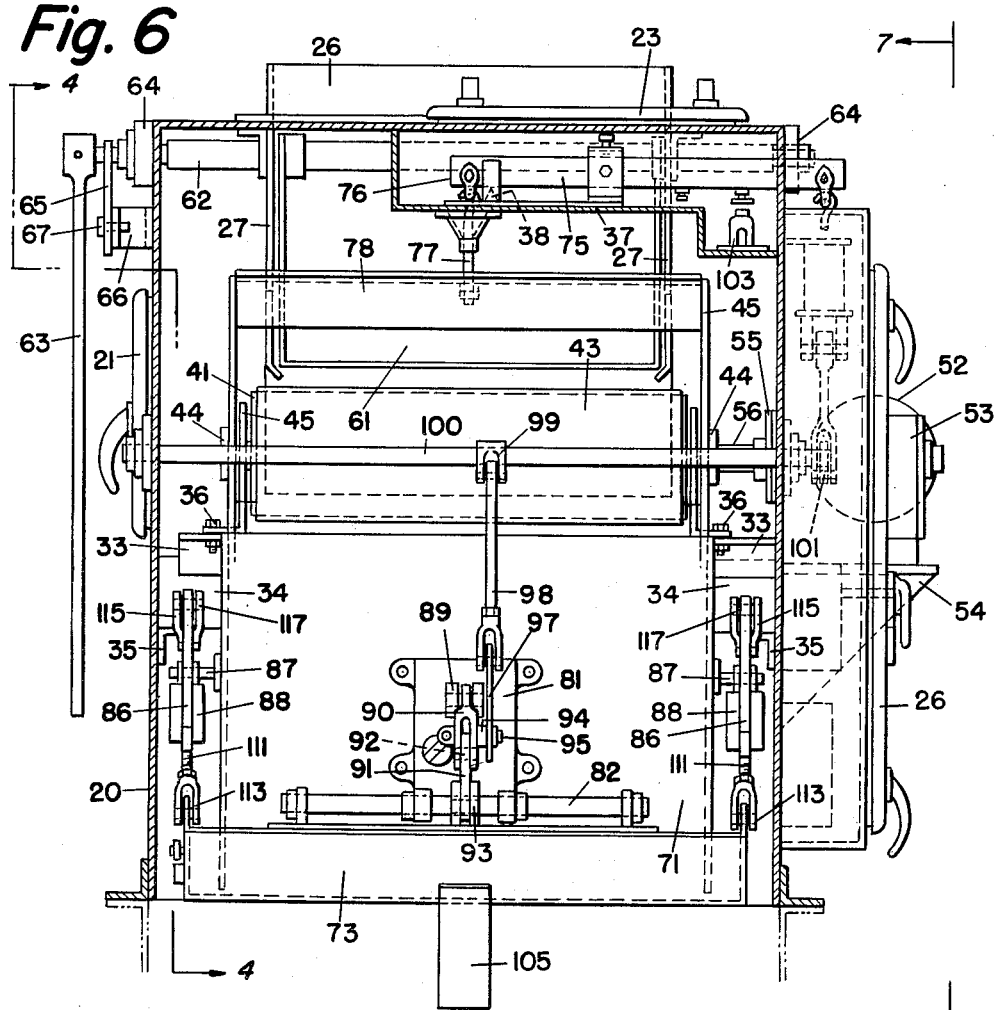
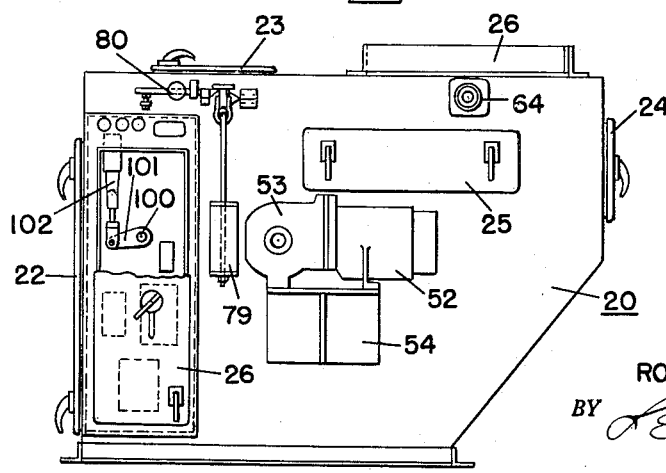
Fig. 7
INVENTOR.
RONALD F. SCHWING
BY *L. Edelson*
ATTORNEY

United States Patent Office 3,017,039
Patented Jan. 16, 1962

3,017,039
COAL HANDLING APPARATUS
Ronald F. Schwing, Philadelphia, Pa., assignor to Beaumont Birch Company, Philadelphia, Pa., a corporation of Pennsylvania
Filed July 21, 1959, Ser. No. 828,590
6 Claims. (Cl. 214—2)

This invention relates to coal handling apparatus, and more particularly is concerned with improved and novel features for automatically measuring a predetermined quantity of coal and delivering the same to a discharge bunker.

Systems for handling coal, chemicals and other free flowing bulk materials including apparatus for automatically weighing the material as it passes therethrough are generally old in the art. One known type of system comprises a receiving hopper into which the material is fed by gravity, a vibrating feeder deck which receives the material from the hopper and feeds it to a weighing apparatus generally supported on a beam type of scale, and controls for automatically discharging the measured material in the weighing hopper upon achieving a predetermined weight. Known constructions, however, have not been entirely satisfactory for several reasons. Firstly, the weighing hoppers are generally equipped with discharge gates which cause the material to be discharged from the weighing hopper at an angle relative to the vertical, and as a consequence the discharged material reacts against the weighing hoppers and disturbs the beam scales resulting in inaccurate readings.

Moreover, in the event of a power failure the electrically operated vibrating feeder deck and control system for opening the weigh hopper discharge gates are disabled and hence prevent the continued feeding of coal as required. In the many industrial applications where the continuous availability of coal is mandatory, an intolerable situation results. Additionally, in the event of electrical and mechanical failure of some part of the coal feeder or weighing system, it is generally required to shut-down the entire coal delivery system in order to get at those parts which must be replaced or repaired. Usually, this requires that the coal present in the system at the time of a breakdown must be removed by hand in order to clear the apparatus for making the necessary repairs.

Accordingly, it is a primary object of my invention to provide a novel coal handling apparatus which in the event of a power failure or electrical or mechanical breakdown of the feeder or weigh scale equipment still permits the continued feeding of coal by providing for a bypass arrangement which conduits the coal around the disabled apparatus.

Another object of my invention is to provide a novel coal handling apparatus which is so constructed that the portion of the apparatus which normally feeds the coal from a source of supply to the weighing scales may be quickly removed from the remainder of the apparatus for repairs and may then be replaced without interrupting the coal feed and without requiring the clearing of the apparatus by hand in order to gain access thereto.

Still another object of my invention is to provide novel coal handling apparatus which includes a weighing hopper having discharge doors of such construction that the coal may be discharged from the weighing hopper in substantially a vertical direction without inducing horizontally directed thrusts in the weighing hopper.

A further object of my invention is to provide a novel coal handling apparatus wherein the coal discharged from the weighing hopper is enabled to be spread more uniformly over a wider surface than heretofore by providing weighing hopper discharge gates of such construction that the maximum possible discharge opening is realized.

Still another object of my invention is to provide a novel coal handling apparatus embodying the foregoing features which in normal operation is automatic, the feeding of coal from a supply hopper to the weighing scales and the discharge therefrom into an underlying discharge bunker being automatically controlled by the level of the coal in the discharge bunker.

The foregoing and other objects of my invention will become apparent from a careful reading of the following specification in conjunction with an examination of the appended drawings, wherein:

FIGURE 6 is an end elevational view of the apparatus according to the invention as illustrated in FIGURE 4 with the end casework being removed to reveal the internal structural details as would be seen when viewed along the lines 6—6 of FIGURE 4;

FIGURE 7 is a reduced side elevational view of the apparatus according to the invention as would be seen when viewed along the lines 7—7 of FIGURE 6, some portions being fragmented for clarity of illustration;

FIGURE 8 is a schematic diagram illustrating the mechanical and electrical organization of the component parts of the apparatus for automatically weighing and feeding the proper quantity of coal to the discharge bunker.

In the several illustrations, like elements are denoted by like reference characters.

Figure 1:
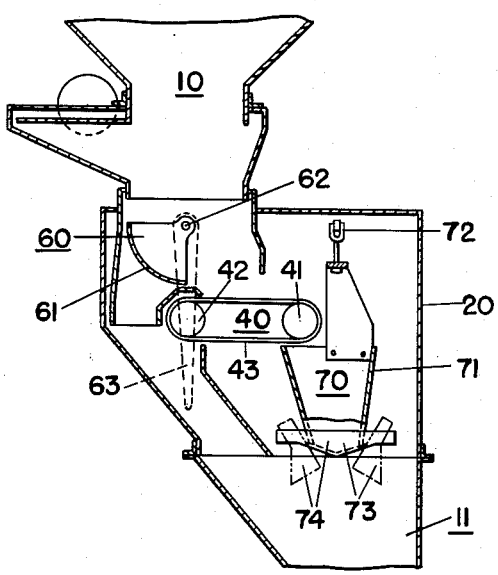
FIGURE 1 is a diagrammatic cross-sectional view of the coal handling apparatus according to the invention, showing the major parts and their functional interrelationship.
Figure 2:
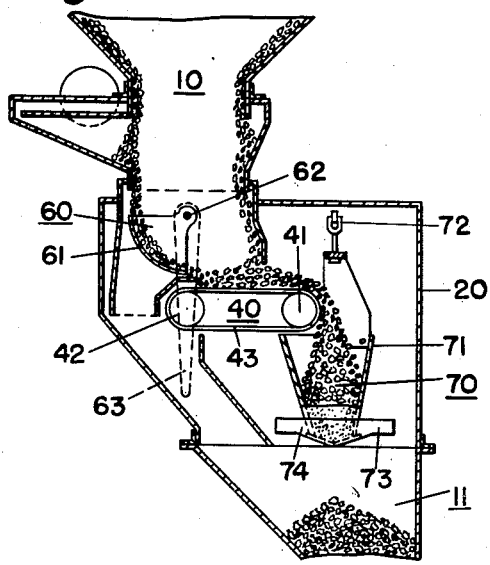
FIGURE 2 is a diagrammatic cross-sectional view of the invention similar to the showing of FIGURE 1 and illustrating the apparatus in the process of automatically delivering coal from a supply source to the weighing hopper preparatory to discharging the coal into the below located discharge bunker.
Figure 3:
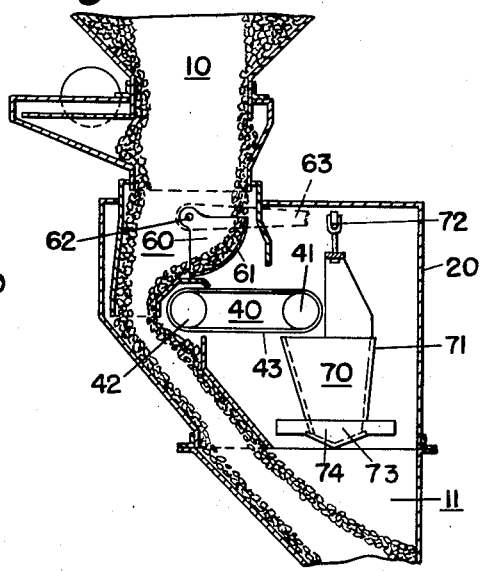
FIGURE 3 is a cross-sectional diagrammatic view of the apparatus according to the invention and as seen in FIGURES 1 and 2 with the exception that the coal handling apparatus is shown in the process of bypassing coal from the supply source around the feeding and weighing portions of the apparatus under conditions where the latter are rendered inoperable.

Before considering the particular constructional aspects of the invention as illustrated in the showings of FIGURES 4 through 8, it will be most conducive to a clear understanding of the invention to first examine the diagrammatic showings of FIGURES 1, 2, and 3 for a general understanding of the invention and the manner in which it operates. Considering first then FIGURE 1, there will be seen a coal receiving hopper 10 disposed to receive coal from a supply bunker and direct the same downwardly into a top opening in the housing 20 of the coal handling apparatus according to the invention. Disposed within the housing 20 is a swingable gate assembly 60 which is operable to direct the coal toward the right onto a belt feeder assembly 40 by means of which the coal is carried into the weigh hopper assembly 70 for weighing and discharging downwardly to the below located discharge bunker 11, or the swingable gate assembly 60 may be operated to divert the coal from the receiving hopper 10 away from the belt feeder assembly 40 and over toward the left where the coal is channeled downward to the discharge bunker 11 without passing through the weigh hopper assembly 70.

FIGURE 2 illustrates the swingable gate assembly 60 in proper position for routing the coal from the receiving hopper 10 onto the belt feeder assembly 40 and consequently through the weigh hopper, whereas FIGURE 3 illustrates the swingable gate assembly 60 in position to divert the coal from the receiving hopper 10 away from the belt feeder assembly 40 and bypassing the weigh hopper.

The swingable gate assembly 60 comprises generally a chute 61 in the form of one quadrant of a closed ended right circular cylinder mounted upon a shaft 62 coinciding with the cylindrical axis, the shaft being journalled in opposite sides of the housing 20 and rotatable on this axis by means of a manually operable handle 63 rigidly secured to the shaft 62 and located externally of the housing 20 for convenient access. Means not shown in the diagrammatic views of FIGURES 1, 2 and 3 are provided for securing the chute section 61 securely in either of the two positions illustrated in FIGURES 2 and 3. The belt feeder assembly 40 comprises generally a driven roller 41, a follower roller 42 and an endless belt 43 trained around the rollers 41 and 42 and of a width somewhat greater than that of the chute 61 so that all of the material discharged from the chute is deposited upon the belt 43. The roller 41 is intermittently rotated by motor means not visible in the diagrammatic showing for conveying the coal deposited upon the belt 43 into the weigh hopper assembly 70, the roller driving motor being intermittently energized in a manner to be subsequently described.

The weigh hopper assembly 70 in general comprises a four-sided enclosure 71 open at the top and the bottom and supported from above at one end of a beam scale 72. Pivotally secured to the hopper enclosure 71 at the bottom thereof are a pair of discharge gates 73 and 74 shown in solid line in their closed position, and in dashed line in open position as when discharging coal from the hopper enclosure 71 downward into the discharge bunker 11.

Assuming for the moment that either a power failure has occurred or an electrical or mechanical breakdown of some part of the belt feeder 40 or weigh hopper assembly 70 has taken place, so that in the latter case at least certain repairs to the damaged portions of the apparatus are required. In either event, the conditions illustrated in the showing of FIGURE 2 are converted to the showing of FIGURE 3 by swinging the bypass gate assembly 60 into position as illustrated in the latter figure so that the coal from the receiving hopper 10 is bypassed around the coal feeder and weighing assembly and downward into the discharge bunker 11. As will be seen in the subsequently described figures, the belt feeder assembly 40 may be readily and easily removed as a unit from within the housing 20 and any necessary repairs may then be readily made. Access to the belt feeder assembly 40, the beam scale assembly 72, and the operating parts of the weigh hopper 70 is easily obtained by a number of doors strategically placed to cover access openings in the housing 20. After the necessary repairs have been achieved, the belt feeder assembly 40 for example may be readily slipped back into the housing 20 and secured in position, and normal automatic operation resumed by swinging the bypass gate assembly 60 again into position as illustrated in the showing of FIGURE 2.

Figure 4:
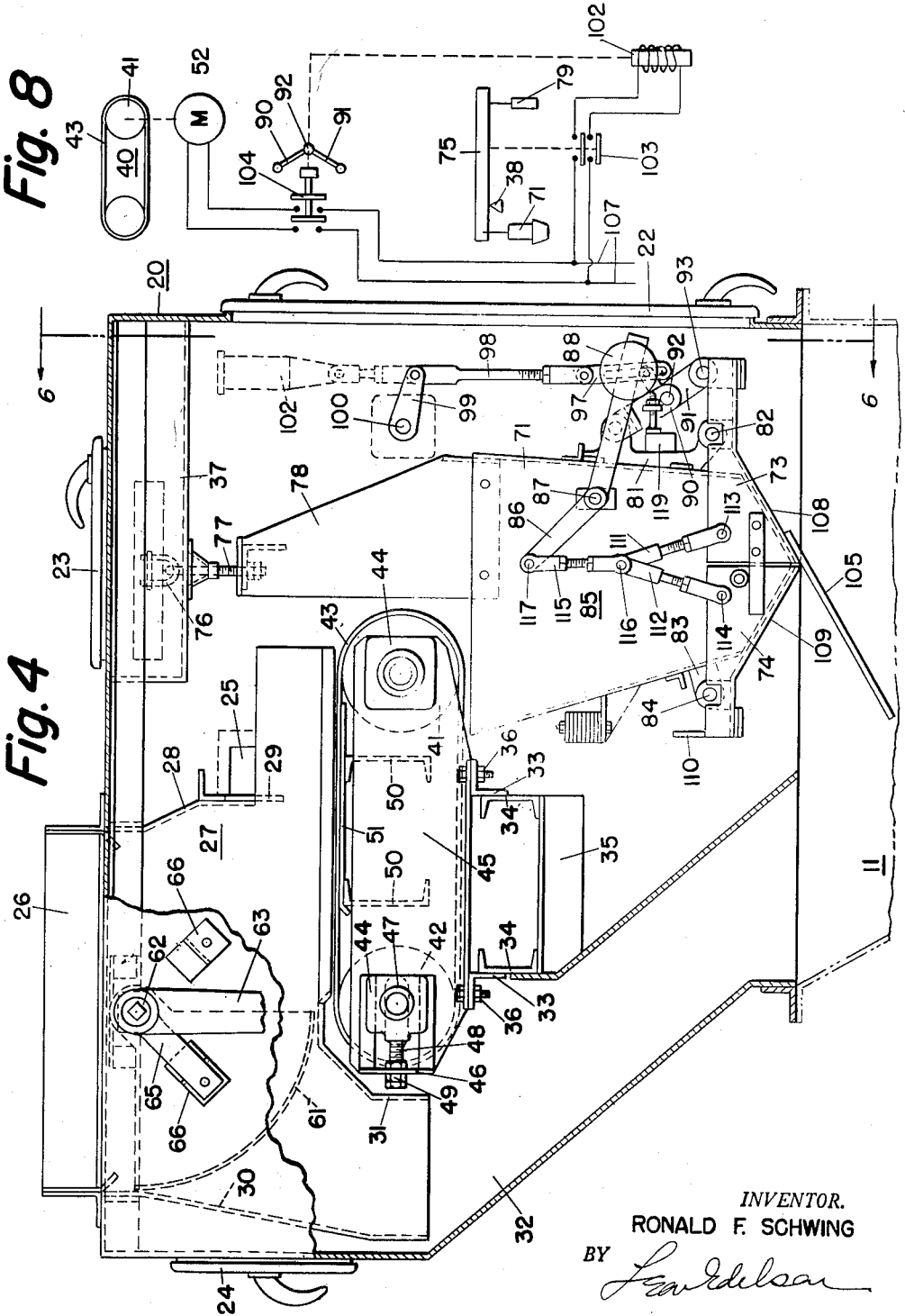
FIGURE 4 is a side elevational view of the apparatus according to the invention with most of the side casework being sectioned away to reveal the interior details of construction and organization.

Understanding now the general organization of the apparatus, attention should now be directed to the showings of FIGURES 4 and 6 which illustrate the important structural aspects of the apparatus. Considering first the housing 20 as seen in the showing of FIGURE 4, there is seen a hatch 26 located in the upper left-hand section into which the coal from the receiving hopper 10 is discharged. The received coal moves downward into the housing 20 and into the chute portion 61 of the swingable gate assembly 60. The chute section 61 is contained within a housing having opposite side walls 27 which extend forward in overlying relationship to the belt 43 of the belt feeder assembly 40 and confine the flow of coal so that it is deposited upon the belt and does not escape laterally into the interior of the housing 20. Bridging between the side walls 27 of the chute housing is a front wall 28 having secured thereto and extending the full width of the front wall a cut-off gate 29. The chute housing front wall 28 and cut-off gate 29 secured thereto restrain the downwardly and forwardly flowing coal from moving beyond the right-hand end of the belt feeder assembly and into the weigh hopper under the force of gravity. Thus, it is insured that coal is not delivered to the weigh hopper when the belt 43 of the belt feeder assembly 40 is not in motion. The housing for the chute 61 also includes a rear wall 30 and a wall 31 immediately to the left of the belt feeder assembly 40, both the walls 30 and 31 forming with the rear sections of the side walls 27 a bypass discharge spout which empties downward into a passage 32 which bypasses the weighing apparatus and discharges downward into the discharge bunker 11.

Turning now to the showing of FIGURE 6, it will be seen that the shaft 62 to which is secured the chute 61 of the bypass gate assembly 60 passes outwardly through the chute housing side walls 27 and is journalled in bearings 64 secured to the side walls of the housing 20. The shaft 62 is seen to continue toward the left beyond the bearing 64 and has secured thereto at its outer end the operating handle 63. Spaced to the right of the operating handle 63 and secured to the shaft 62 is a locking arm 65 detachably connected to a locking bracket 66 by means of a locking pin 67. The bracket 66 is one of two such brackets, both of which may be seen in the showing of FIGURE 4, each secured to the side wall of the housing 20, as for example by welding.

Considering now FIGURES 4 and 6 together for the best understanding of the structure of the belt feeder assembly 40, it will be seen that the rollers 41 and 42 are journalled in bearings 44 mounted at opposite ends of a pair of parallel extending side frame angle members 45 bridged transversely at the left-hand end by an endplate 46. The bearings 44 which rotatably mount the driven roller 41 of the right-hand end of the belt feeder assembly 40 are fixedly secured to the side frame angle members 45 so that the driven roller 41 is maintained in fixed relationship thereto. However, the bearings 44 which mount the left-hand follower roller 42 to the side frame angle members 45 are not fixedly secured to the latter but are shiftable toward the left or the right within the slots 47 to thereby shift the follower roller 42 further from or closer to the driven roller 41, so that the tension in the belt 43 may be adjusted. The shifting of the follower roller 42 is accomplished by means of the bolts 48 threaded into the bearings 44 and through the endplate 46, the adjusted bearing position being fixed by the nuts 49.

Extending transversely between the side frame angle members 45 and secured thereto are a pair of channel members 50 which in turn carry a belt supporting plate 51. The channel members 50 rigidify the belt feeder assembly 40, and the belt support plate 51 prevents the weight of coal deposited upon the endless belt 43 from causing the latter to sag or break due to the very large tension forces which would be induced therein in the absence of the belt support plate 51. The entire belt feeder assembly 40 is supported by the side walls of the housing 20 through the medium of a shelf extending transversely therebetween and secured thereto. The shelf comprises a pair of angle irons 33 welded to a pair of channel members 34, the opposite ends of which are seated upon and secured to angle brackets 35 welded to the inside surfaces of the housing 20 side walls. The belt feed assembly 40 is secured from shifting under the impact of coal flowing thereonto by means of the bolting fasteners 36 which secure the belt feeder assembly side frame angle members 45 to the angle irons 33.

For purposes of driving the driven roller 41 of the belt feeder assembly, there is provided a motor 52 coupled to a speed reducer 53, both of which are supported by a bracket 54 secured to the outside of the housing 20 and best seen in the showings of FIGURES 6 and 7. The speed reducer 53 is coupled to a drive shaft 56 by means of a coupling 55, the drive shaft 56 being an extension of the axle of the driven roller 41. In order to remove the belt feeder assembly 40 from the interior of the housing 20 it is only necessary to open the access door 25 in the housing 20, to disconnect the drive shaft 56 from the coupling 55, and release the bolting fasteners 36 securing the belt feeder assembly frame members to the supporting angle irons 33 on the motor side of the housing, and to similarly release the bolting fasteners 36 on the left-hand side of the housing by opening the access door 21. The entire belt feeder assembly may then be slipped outwardly through the housing 20, toward the left as viewed in FIGURE 6, through the housing aperture normally covered by the access door 21. The belt feeder assembly 40 may, of course, be replaced within the housing in exactly the same manner. Moreover, if it is desired to adjust the tension of the endless belt 43 without removing the entire assembly 40 from the housing, the adjusting bolts and nuts 48 and 49 associated with the follower roller bearings may be reached through the access doors 21 and 25 on the opposite sides of the housing 20.

Turning now to an examination of the weigh hopper assembly 70, it is observed that the hopper enclosure 71 is freely suspended from above at one end of a beam-balance scale beam 75 by means of a yoke 76, a bolting assembly 77, and bonnet 78. The beam balance fulcrum 38 is located immediately to the right of the supporting yoke 76 and is rigidly secured to the supporting platform 37, which latter is rigidly secured to the inside of the housing 20. The balance beam 75 extends to the right through the housing wall, as best seen in the showing of FIGURE 6, and has hung to its right-hand end a counterweight 79 (see FIGURE 7) which counterbalances the weight of the weigh hopper enclosure 71 and other apparatus secured thereto. An additional mass may be included with the counterweight 79 to correspond to a predetermined maximum desired weight of coal so that the beam balance will tip when that particular weight of coal has been deposited in the hopper enclosure 71. Desired variations from this predetermined weight of coal can be compensated for by an auxiliary counterweight system generally designated as 80 in the showing of FIGURE 7.

Secured to the front of the hopper enclosure 71 is a supporting bracket 81 which carries a rotatable shaft 82. Rotatably supported by the shaft 82 is the discharge gate 73. Similarly supported from the rear side of the hopper enclosure 71 by brackets 83 and shaft 84 is the discharge gate 74 as viewed in FIGURE 4. The discharge gates 73 and 74 are seen to be coupled together at opposite sides of the hopper enclosure 71 by a pair of inverted supporting Y-yokes 85, each of the supporting yokes 85 being pivotally connected to each of the discharge gates and to one end of a counterweight supporting member 86, the latter being pivotally secured to the hopper enclosure 71 as at 87 and having secured to its free end a counterweight 88. The yokes 85 each include a pair of arms 111 and 112 respectively pivoted to the discharge gates 73 and 74 by pivots 113 and 114, and pivotally connected to each other and to the vertical stems 115 of the Y-yokes by a pivot 116, the stem 115 being pivoted to the counterweight supporting member as at 117.

Pivotally secured to a lug 89 projecting outwardly from the support bracket 81 is the upper member 90 of a two link toggle assembly, the lower link 91 being pivotally connected to the upper link at 92 and pivotally secured to the discharge gate 73 at 93. Projecting outward from the upper toggle link 90 is a lug 94 carrying a stud 95 slidably disposed within a slot 96 in a vertically shiftable link member 97, the latter being pivotally connected to an upwardly extending rod 98. The upper terminus of the rod 98 is pivotally connected to a crank arm 99 keyed to a shaft 100 which is journalled through opposite side walls of the housing 20. Also keyed to the shaft 100 and located externally of the housing 20 is a second crank arm 101 pivotally connected to the plunger of a solenoid 102. The solenoid 102 is electrically energizable by the switch 103 when the beam 75 of the beam-balance breaks contact with the switch button as the hopper enclosure 71 descends under the influence of a predetermined weight of coal deposited therein. When the coal in the hopper 71 has been discharged by virtue of the opening of the discharge gates 73 and 74, as will subsequently be described, the hopper enclosure 71 will rise due to the counterbalancing effect of the counterweight 79, and the solenoid 102 will be deenergized because the beam-balance beam 75 again will engage the button of the switch 103 and cause the switch to open.

Figure 5:
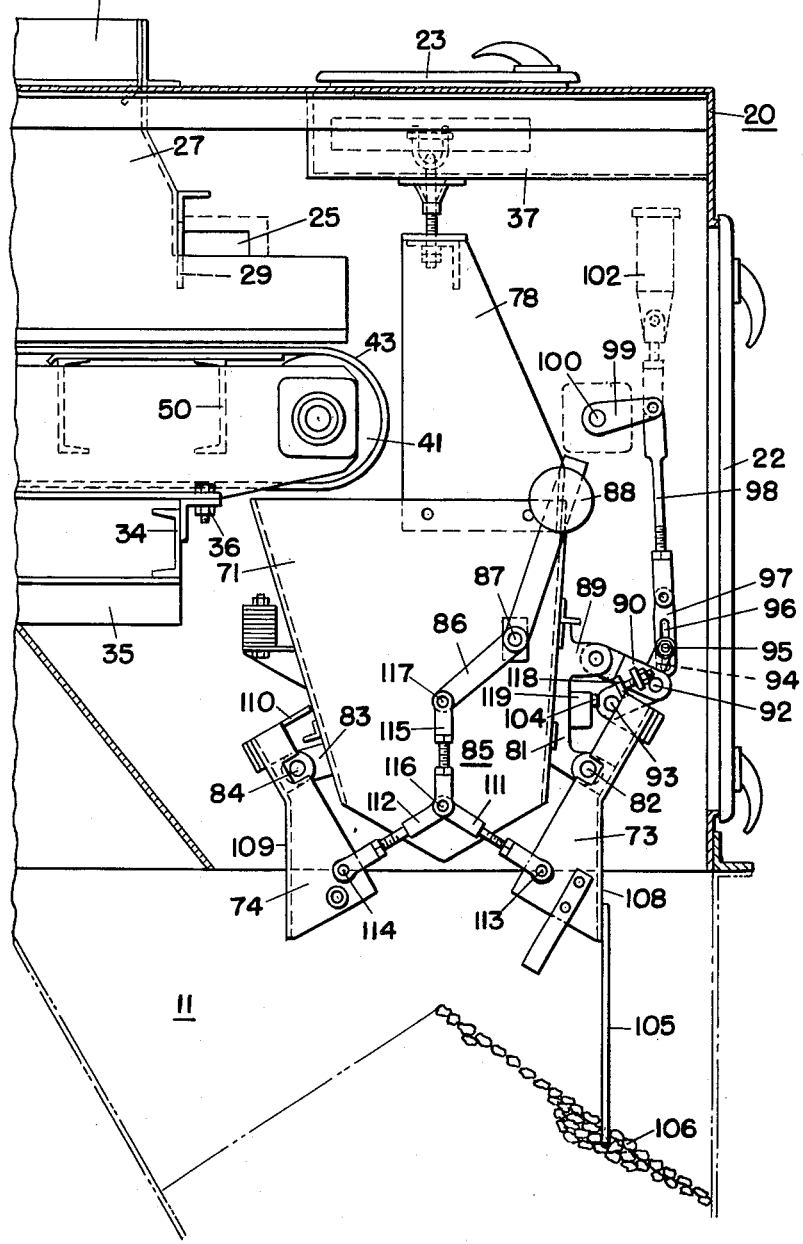
FIGURE 5 is an enlarged fragmentary view of the right-hand half of the showing of FIGURE 4, and illustrates the weigh hopper discharge gates in open position as when discharging the contents of the weighing hopper.

A second switch 104 is mounted to the support bracket 81 on the hopper enclosure 71 and is so positioned relative to the toggle links 90 and 91 that it is actuated when the toggle links are in their position as seen in the showing of FIGURE 4 and is deactuated when the toggle is broken as seen in the showing of FIGURE 5. Thus, the switch 104 is actuated when the discharge gates 73 and 74 are closed, and is deactuated when the discharge gates are open. The switch 104 when actuated causes energization of the motor 52 which in turn drives the roller 41 of the belt feeder assembly and hence causes coal to be fed into the weigh hopper. Conversely when the switch 104 is deactuated, as when the toggle is broken and discharge gates 73 and 74 are open, the motor 52 is deenergized and no coal is fed into the weigh hopper because the belt feeder assembly remains motionless.

Considering now FIGURE 8, in conjunction with the other figures for an understanding of the cycle of automatic operation of the apparatus, it is seen that a source of electrical energization 107 connects to each of the switches 103 and 104 and that both switches are seen to be deactuated. That is, motor 52 and solenoid 102 are both deenergized. The conditions illustrated in FIGURE 8 correspond to the showing of FIGURE 5 where it is seen that the hopper discharge gates 73 and 74 are open and the drag paddle 105 secured to the discharge gate 73 projects vertically downward and has its end buried in the coal pile 106 in the discharge bunker 11. The drag paddle 105 prevents the discharge gates 73 and 74 from swinging upward and closed under the influence of the counterweight 88, so that the switch 104 is deactuated and the belt feeder assembly 40 remains motionless.

Although the drag paddle 105 prevents the discharge gate 73 from rotating closed on the shaft 82 it does not prevent the entire hopper enclosure 71 from riding vertically upward after having discharged the load of coal therein, so that the switch 103 is likewise in an open state and the solenoid 102 is deenergized. As the coal pile 106 drops in level as coal is withdrawn from the bottom of the discharge bunker 11 the drag paddle 105 at some point is no longer able to prevent the counterweight 88 from swinging downward and hence causing the supporting yokes 85 to be shifted upward by the pivoted counterweight member 86. Thus, the discharge gates 73 and 74 are pivoted on the shafts 82 and 84 and pulled upward into closing engagement with the bottom of the hopper 71. Simultaneously, of course, the end of the lower toggle link 92 which is pivotally connected to the discharge gate 73 by the pivot 93 is forced downward and causes the pivot connection 92 between the upper and lower toggle links 90 and 91 to ride inward to the left and into the position shown in FIGURE 4, in which position a stud 118 carried by the link 90 engages a stop 119 secured to the support bracket 81 which prevents further inward motion of the pivot 92. However, it will be observed that the pivot 92 is in an overridden position, so that any tendency of the discharge gate 73 to move downward would cause the pivot point 92 to move further toward the left. Such further motion, is however, impossible by virtue of the previously mentioned mechanical stop 119 and stud 118 so that the discharge gate 73 is effectively locked in its closed position and hence so is the discharge gate 74.

Understanding now that the discharge gates 73 and 74 are closed and locked in closed position by the toggle, and that the shifting of the toggle pivot 92 inward toward the left has caused the switch 104 to be closed, it is seen that the motor 52 will become energized from the source of electrical energy 107. The belt feeder assembly will, therefore, be activated and coal will be delivered thereby into the weighing hopper 71. The belt feeder assembly will continue to operate until the predetermined amount of coal necessary to overcome the counterweight 79 hung onto the beam balance has been deposited into the hopper 71. At this time the beam balance will tip about the fulcrum 38 and actuate the switch 103 thereby energizing the solenoid 102. Energization of the solenoid 102 causes the solenoid plunger to be drawn upward into the solenoid and hence to rotate the crank arm 101, shaft 100, crank arm 99 and vertically shift the rod 98 and link member 97, and thereby break the toggle by pulling upward on the stud 95.

Once the toggle lock has been broken the weight of coal in the hopper 71 overcomes the counterweight 88 and forces the discharge gates 73 and 74 downward into the open position illustrated in FIGURE 5 and causes the coal to be discharged into the underlying discharge bunker 11. The breaking of the toggle, of course, deactuates the switch 104 and opens the circuit from the electrical energizing source 107 to the motor 52 resulting in immediate stoppage of the belt feeder assembly. The drag paddle 105 again becomes partially buried in the coal pile 106 and prevents the discharge gates 73 and 74 from swinging shut until the coal pile 106 has again been lowered in level to the point where the drag paddle 105 is no longer able to maintain the discharge gates open against the force of the counterweight 88 tending to close the same.

It should be observed that the discharge gates 73 and 74 are constructed with downwardly sloping undersurfaces 108 and 109 respectively as viewed in the showing of FIGURE 4 with the gates in closed position, and that the discharge gates sides are generally triangular in shape conforming to the shape of the lower side portions of the hopper enclosure 71. When the gates are opened to discharge the coal in the weigh hopper the surfaces 108 and 109 are rotated into substantially a vertical position even though the discharge gates are rotated through an angle less than 90° before having their rotational motion interrupted by the bearing of the stops 110 on the discharge gate 74 against the rear wall of the hopper enclosure 71. Thus, the discharging coal dropping vertically out of the weigh hopper is not thrown upon the discharge gates and no reaction forces are thereby exerted upon the beam balance.

Having now described my invention in conjunction with a particularly illustrated embodiment thereof, it will be appreciated that various changes and modifications will occur from time to time to those persons normally skilled in the art without departing from the essential spirit or scope of my invention, and accordingly it is intended to claim the same broadly as well as specifically as indicated by the appended claims.

What is claimed as new and useful is:

1. A bulk material delivery apparatus comprising, in combination, a bulk material inlet hatch, a bulk material discharge station, an intermittently operable conveyor positioned partially beneath said inlet hatch and extending between said inlet hatch and said discharge station effective when operated to cause bulk material entering the apparatus through the inlet hatch to be delivered to the discharge station, an auxiliary discharge passage communicating at one end thereof with an auxiliary discharge outlet and communicating at the other end thereof with the aforesaid inlet hatch to thereby form a bypass route by means of which material entering the inlet hatch may be conduited around the said conveyor and discharge station, and a selectively shiftable gate disposed below the inlet hatch and above the said conveyor and auxiliary discharge passage, said gate when shifted into a first position being operative to simultaneously direct bulk material entering said inlet hatch onto said conveyor and to prevent the flow of any bulk material into said auxiliary discharge passage, and said gate when shifted into a second position being operative to simultaneously direct bulk material entering said inlet hatch into said auxiliary discharge passage and to prevent the flow of any bulk material onto said conveyor or into the region occupied by said conveyor.

2. The apparatus as defined in claim 1 having a housing therefor which includes an access doorway through one wall thereof closed by a door, said doorway being located adjacent to said conveyor and of sufficient size to permit the conveyor to be shifted bodily therethrough in either direction when said door is open, whereby when said gate is shifted into its aforesaid second position the conveyor is isolated from the bulk material and may be removed from said housing for servicing thereof while the bulk material is diverted through the said auxiliary passage, said conveyor being then re-installable and rendered operable by shifting the gate into its aforesaid first position.

3. The apparatus according to claim 1 wherein said shiftable gate comprises a chute underlying the inlet hatch and extending substantially the full width of the latter, said chute having a pair of substantially parallel side walls in the form of circular quadrants disposed at opposite sides of the hatch, and a curved chute plate joining the side walls along their curved periphery, chute supporting means journalled in bearings fixedly located relative to the inlet hatch, operating means for rotating the chute to shift the same between said first and second selectable gate positions, and locking means for securing said chute in either selectable gate position, the curvature of said curved chute plate being such that the flow line of at least a portion of the bulk material flowing downward into the inlet hatch is smoothly turned from a vertical line to substantially a horizontal line of flow coplanar with that of the material on said conveyor.

4. The apparatus according to claim 1 wherein said bulk material discharge station comprises a weigh-scale hopper into which bulk material is delivered by said conveyor when the latter is operated, said hopper having a bottom opening closed by swingable doors which open to discharge the contents of the hopper when a predetermined weight of material has been deposited therein, and means associated with and operable by said doors to automatically render said conveyor inoperative while said doors remain open.

5. In a bulk material delivery apparatus including a housing having a bulk material inlet hatch and means for causing bulk material entering the apparatus through the inlet hatch to be delivered to a discharge station, a discharge station comprising a hopper enclosure open at the top to receive bulk material from the delivery means and open at the bottom to downwardly discharge the received bulk material, a pair of discharge gates pivotally secured to said hopper for rotational motion relative thereto in a vertical plane, said discharge gates being rotatable upwardly to close the open bottom of said hopper and being rotatable downwardly to open the bottom of said hopper, a pair of elongated rigid link members each pivotally connected at one end thereof to a different one of said gates and pivotally connected together at their other ends, a counterweighted lever coupled to the pivotally connected together ends of said link members for shifting the latter in an upward direction to effect simultaneous closing of said gates, a toggle locking mechanism coupled to said hopper and to one of said gates for automatically locking said gates by being shifted into an overridden condition when the gates have been rotated into closed position by said counterweighted lever, and control means responsive to the deposition of a predetermined mass of bulk material in said hopper effective to break the toggle lock and allow said gates to swing downward by shifting the toggle locking mechanism out of its overridden condition.

6. The apparatus according to claim 5 wherein the said bulk material delivery means is electrically operated, and wherein said hopper mounts an electric switch proximate said toggle locking mechanism, said switch being automatically actuated by said toggle to operate said delivery means when said toggle is in its overridden gate locking position, and said switch being automatically actuated by said toggle to interrupt operation of said delivery means when said toggle is broken to allow said gates to swing downwardly open.

References Cited in the file of this patent

UNITED STATES PATENTS

| | | |
|---|---|---|
| 1,290,405 | Suter | Jan. 7, 1919 |
| 2,372,746 | Stock | Apr. 3, 1945 |
| 2,625,001 | Heun | Jan. 13, 1953 |
| 2,626,719 | Stock | Jan. 27, 1953 |

OTHER REFERENCES

Germany, P12764xI/81e, Aug. 30, 1956.